Jan. 22, 1963   G. T. HEMMETER   3,074,148
RASP HUB
Filed Jan. 11, 1960   2 Sheets-Sheet 1

INVENTOR.
GEORGE T. HEMMETER
Lothrop & West
ATTORNEYS

United States Patent Office 3,074,148
Patented Jan. 22, 1963

3,074,148
RASP HUB
George T. Hemmeter, Los Altos, Calif., assignor to Alton E. Tobey, Santa Cruz County, Calif.
Filed Jan. 11, 1960, Ser. No. 1,597
3 Claims. (Cl. 29—79)

My invention relates to devices for removing surplus tread rubber from a tire casing and is of the sort generally utilized in the automotive tire trades for taking off excess vulcanized rubber from a casing to prepare the casing for subsequent recapping. A hub device for a somewhat different purpose, but having certain features in common, is shown in my copending application entitled Device For Treating Tires, filed January 11, 1960, with Serial No. 1,598.

A tire hub usually includes an abrading drum having projections extending from its periphery and mounted on an arbor to be rotated rapidly so as to buff, rasp or otherwise strip the excess rubber from a tire casing held in abrading relationship with the rotating hub. Even the best quality cutters of a commercial rasp wear out rather quickly. In some instances, the cutters are in the form of a tack band which must be replaced; but preferably the cutters are metal blades mounted in a hub, and it is necessary only to replace these cutter blades.

Tack rasps, although relatively fast in rubber removal, are short-lived and are plagued by broken tacks which become dangerous to the operator. Besides, tacks produce a rough rasped surface which is not conducive to optimum conditions for vulcanization to the camelback. Exposed beauty walls of the tire must be fine buffed by wire brushing or by striking with an abrasive wheel.

Hubs employing replaceable blades are generally considered safer to use than tack rasps. However, they are slow cutting and consume greater power because the blades buff the rubber rather than cut it. Although blade life is somewhat longer than tack rasps, blades are slower in operation and therefore more costly to operate. Changing of blades is more time-consuming. Forcing the blades to cut fast tends to burn the rubber, which condition makes vulcanization to the retread rubber virtually impossible. Because of the spiral pattern of blades of all hubs used by the art up to this time, it has been impractical to use these types of hubs for cross buffing where reverse and forward rotations of the hub are necessary.

It is therefore an object of this invention to provide a hub for a rasp which is safe to operate in either direction.

It is another object of the invention to provide a hub for a rasp whose blades are accurately positioned.

Another object of the invention is to provide a hub for a rasp whose blades can be changed without removing the hub from the arbor.

Another object of the invention is to provide a hub whose elements are independently held without aid of the arbor or its devices.

Another object of the invention is to provide a hub which produces a smoother buffed surface than the prior art devices.

Another object of the invention is to provide a hub that is non-directional in its operation.

A still further object of the invention is to provide a hub suitable for dual blade mounting for the maximum in smoothness of the treated or finished surface.

A still further object of the invention is to provide a rasp suitable for reverse rotation during cross buffing.

Another object of the invention is to provide a hub suitable for use in holding blades for "tractionating" a tire, as described in my above-identified copending application.

Other objects of the invention, together with the foregoing, are attained in the embodiment of the invention described in the accompanying description and illustrated in the accompanying drawings, in which.

Figure 1:
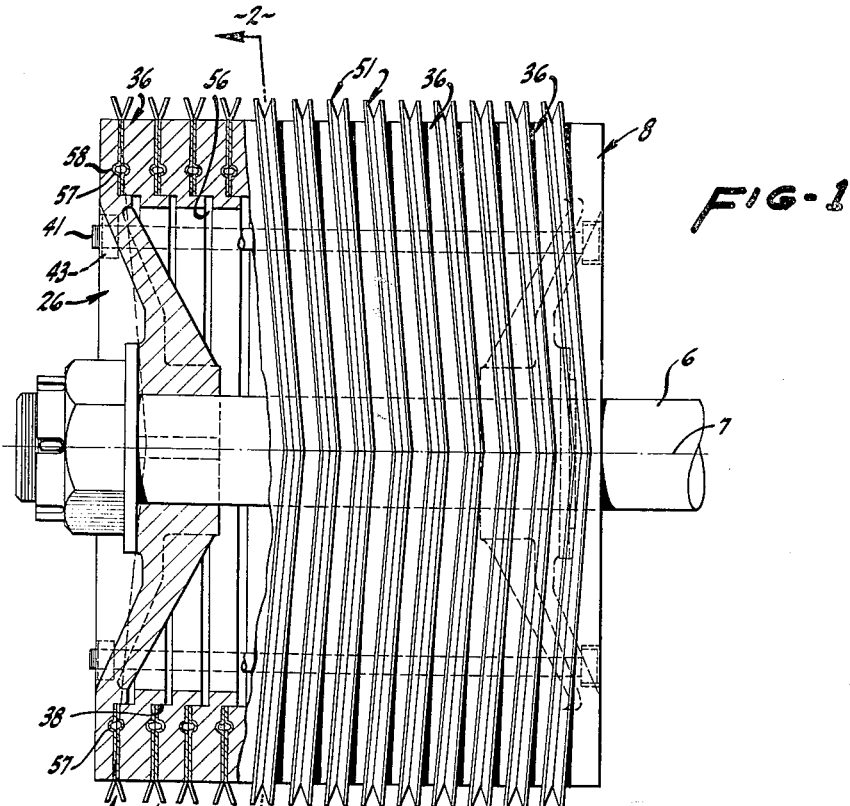
FIGURE 1 is a side elevation, with some portions in diametrical cross-section, of a hub constructed in accordance with the invention.

While the hub assembly can be embodied in a number of different forms, depending on the particular type of usage to which it is to be put, it has successfully been incorporated for normal commercial use in substantially the form shown herein.

In this arrangement, there is provided a shaft 6, or arbor, which is mounted by means (not shown) for rotation around a central axis 7 at the desired rotational speed. Appropriately mounted on the shaft 6 and conveniently keyed thereto is an inboard head 8. This member is preferably a casting having not only a boss 9 which encompasses the shaft 6 but having also a somewhat conical web 11 or flange reinforced by ribs 12. The web 11 merges with a circumferential, annular rim 13. While the rim is annular, it is not of the same cross-section on successive radial planes. The outside periphery 14 of the rim is a circular cylinder and the inward face 16 is planar. The outward face 17 is divided into any number of segments; for example, quadrants by intersecting, diametrical planes disposed at right angles to each other and lying on the rotational axis 7.

In one segment or quadrant 21, for example, the outward face 22 is a generated, helical surface, each element of which passes through the rotational axis 7, is at right angles or normal thereto and proceeds with a helical pitch in one direction, for example, to the right, so that the surface 22 coincides with a right-hand helix. In the successive or adjacent quadrant 23, the outward surface 24 is also generated by a radial line normal to the rotational axis 7 and the pitch of the helix is the same as that of the helix in the quadrant 21 but the direction of the helix is of the opposite hand, or to the left. The surface 24 corresponds with a left-hand helix. In a similar fashion, the two remaining quadrant surfaces of the head 8 are alternately right-hand helical surfaces and left-hand helical surfaces.

In a comparable fashion, there is provided an outboard head 26 in general similar to the inboard head 8 and provided on its inward face with oppositely directed helical surfaces 27 and 28 in the adjoining quadrants. The outward surface 29 of the outboard head is planar and normal to the rotational axis 7 and the peripheral surface 31 is a circular cylinder. The helical surfaces 27 and 28 are designed to correspond exactly with the surfaces 22 and 24.

The rim 32 of the outboard head 26 is provided with an exterior circular cylindrical surface 33 of a diameter to fit within an interior cylindrical surface 34 on the ring 36. Similarly ring 36 is provided with an exterior cylindrical male surface 38 of a diameter to snugly fit into either a mating female interior cylindrical surface of adjacent ring 36 or a similar interior cylindrical surface of the head 8 as the case may be.

A plurality of rings 36 are provided to intervene between the heads. Each ring on one side 37 has a contour duplicating substantially the contour of the inboard head 8 and on the other side 38 has a superficial contour substantially duplicating the corresponding contour of the outboard head 26. The surfaces 33 and 34 are also duplicated. When sufficient rings 36 are interposed between the heads 8 and 26, the various surfaces 33 are piloted into or telescope with the surfaces 34 and the various helical surfaces nest so that, in effect, a built up drum is provided.

To hold the various drum parts together, a plurality of through bolts 41 are provided. These have enlarged heads 42 at one end adapted to be countersunk in the head 8 and receive nuts 43 at the other end adapted to be countersunk in the head 26. The bolts are equally spaced on axes 44 and 46 at equal radial distances from the axis 7.

The device is designed to receive various types of blades. Several types of blades are more particularly disclosed in my copending applications entitled Rasp Blade Construction, filed January 11, 1960, Serial No. 1,675, and Device For Treating Tires, filed January 11, 1960, Serial No. 1,598. Each of the blades 51 is a quadrant of an annulus having a substantially central aperture 52 therein to fit over the adjacent one of the bolts 41 and has a generally arcuate interior surface 53 designed to overlie the subjacent surface 38 on one of the rings 36. The outer periphery of each blade is provided with a number of rasp teeth 54. The rasp blades may be placed back-to-back in paired relationship for optimum smoothness in cut and are interposed between successive ones of the rings 36 or between one of the heads 8 or 26 and an adjacent ring 36.

Figure 2:
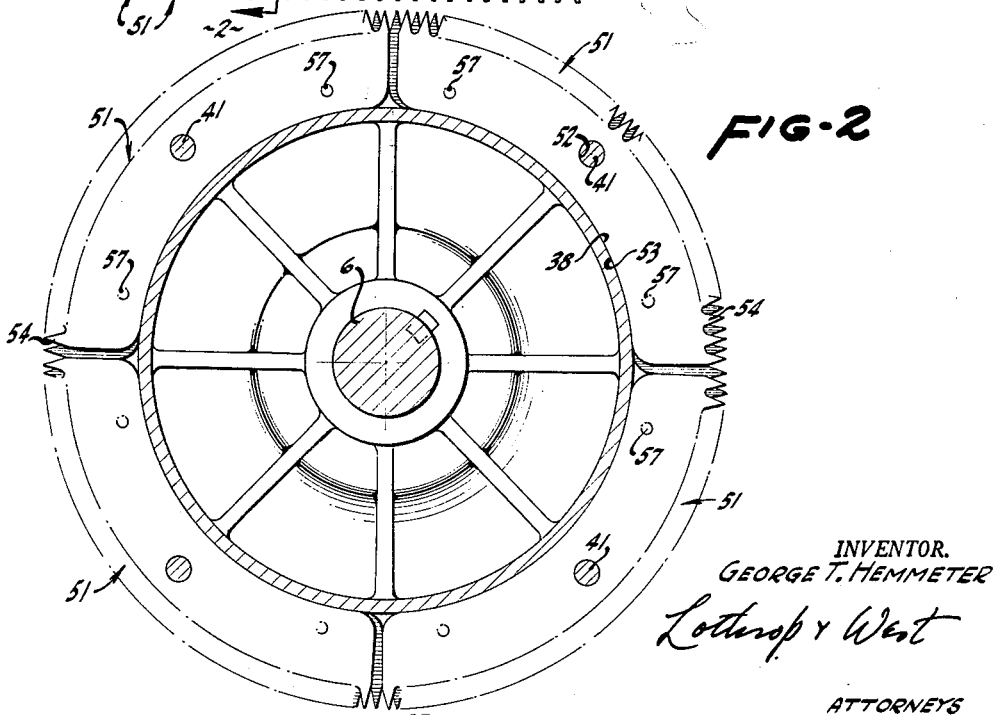
FIGURE 2 is a cross-section taken on the line 2—2 of FIGURE 1, certain portions being shown by conventional broken lines.
Figure 3:
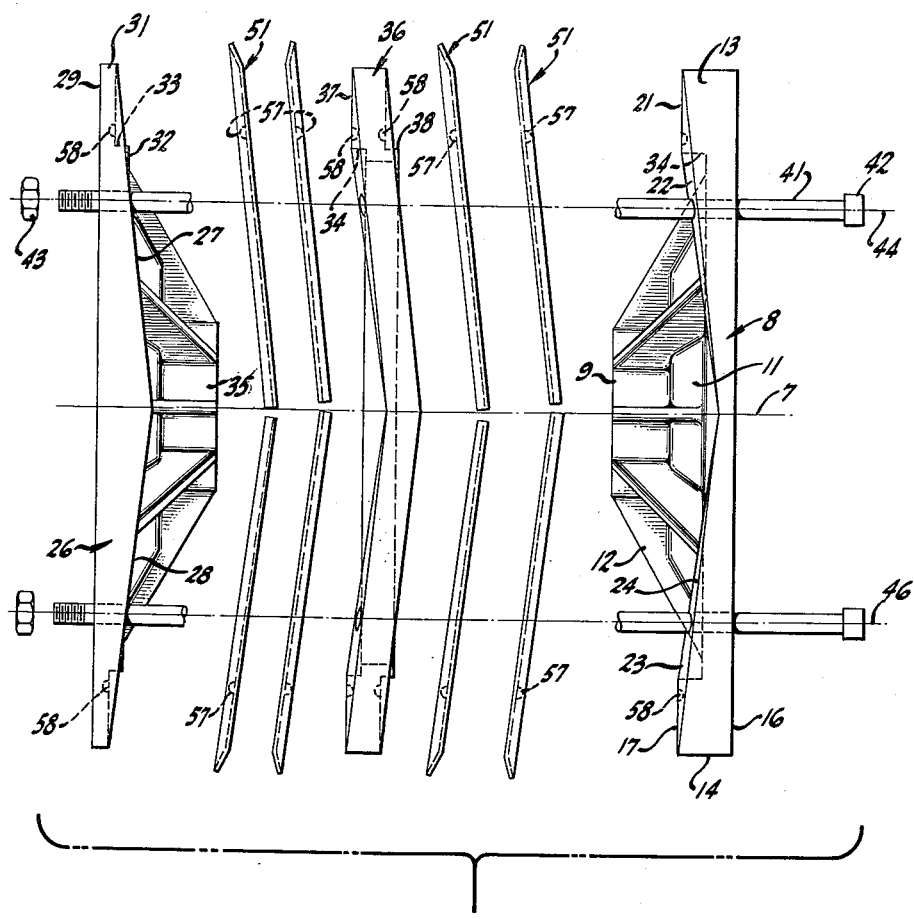
FIGURE 3 is an exploded view of the components of the hub with dual blades.

If the teeth are coplanar with the blades, the blades 51 are placed back-to-back to afford a staggered tooth arrangement. If the teeth are offset, the blades are also placed back-to-back and are preferably disposed with their staggered rasp teeth 54 offset in opposite directions, as shown in FIGURE 2. The blades are slightly twisted or warped when they are clamped after being positioned between the plates 36 and are thus disposed in approximately helical paths for their respective quadrants. The blades in the successive quadrants have opposite directions of advance or pitch. Preferably, the thickness of a pair of the blades 51 when placed back-to-back is such with respect to the dimensions of the heads 8 and 26 and the intervening rings 36 that there remain clearance grooves 56 (FIGURE 1). Thus, when the bolts 41 are positioned and the nuts 43 are cinched tightly, there results a virtually solid drum with the rasp blades clamped firmly between the successive parts.

In some instances, the rasp blades have apertures other than the aperture 52 for manufacturing reasons or other purposes but in order to supplement the locating and holding power of the through bolts 41 and the sleeved surfaces 33, each rasp blade 51, on the side toward which the teeth 54 are inclined (should they be inclined), is provided with an outstanding dimple projection 57 in a particular location. The heads 8 and 26 and the intervening plates 36 all have depressions 58 formed therein to receive the neighboring projections 57. The size of the depressions and their location are preferably such and the dimpled projections 57 are so contoured, usually conical, that there is a centering and wedging effect when the rasp blades are positioned and the bolts 41 are tightened. Thus, the entire assembly is quite firmly locked together accurately so that high speed rotation of the mechanism is safe and does not produce undue unbalance or vibration. The height of all cutter blades is uniform and slasher teeth are eliminated.

In use, the rasp blades, in effect, scan the surface of an adjacent tire, first to the right and then to the left, since the pitch of the various helices is approximately the same as the spacing between the successive rings or the grooves in which the blades seat and the spread of the back-to-back blades is such that there is substantial coverage of all of any abraded surface, with some overlap if desired.

After protracted use, the teeth 54 become worn. It is then a simple matter to withdraw one of the bolts 41 individually and to loosen the rest of them and then in the boltless quadrant to extract the worn blades. This can be done after the heads 8 and 26 and at least one of the intervening rings 36 have been axially spread apart sufficiently so that the blades can be extracted by an axial movement to remove the projections 57 from the depressions 58, followed by a radially outward extraction. As soon as a pair of blades has been withdrawn, a succeeding pair can be removed and for each pair withdrawn a new pair can be introduced. Thus, the entire mechanism can be recharged with new blades without ever taking it from the shaft 6 and without totally disassembling it, the bolts 41 being removed and replaced in succession and being finally retightened after all the new blades have been installed. If desired, the bolts 41 can be withdrawn entirely and all of the blades can be removed. Alternatively, the entire mechanism with the bolts 41 still in place can be removed from the shaft as a unit and rebladed at the bench or replaced by a comparable unit.

There is thus afforded a highly flexible tire rasp which can readily be rebladed without difficulty and in a short time, which runs truly and smoothly at relatively high speed, which scans the surface to be abraded uniformly, first to the right and then to the left with more or less overlap as desired and which therefore is independent of rotational direction, which because of the through fastener bolts cannot explode if the arbor nut becomes loosened, which can be handled independently as an integral unit when removed from the driving arbor, which rasps first to the right and then to the left, and which, in general, is a strong and safe device and one which can be built up to any face width as desired.

Whereas the drawings show a hub with two stages of right- and left-hand helices to form a zigzag blade arrangement, it is a simple design innovation to provide either a single stage right-and left-hand helix as in a wobble plate to obtain a right- and then left-hand rasping stroke or to provide more than two stages of right- and left-hand helices to form a plurality of zigzag configurations. The former is desirable for small diameter rasps where each blade can be a complete circle without excessive waste of blade material; the latter is desirable for large diameter rasps where multisegmental form of the blades can be manufactured with reasonable economy without great waste of blade material.

What is claimed is:

1. A hub comprising a generally cylindrical centrally apertured head with one face having alternately right and left handed helical surfaces in a plurality of successive segments, said head having a circular cylindrical surface outstanding from said face and concentric with the central aperture therethrough, a second generally cylindrical centrally apertured head with one face having alternately right and left handed helical surfaces in a plurality of successive segments and a cylindrical recessed surface concentric with the aperture therethrough, said recess of a diameter to receive the circular cylindrical surface of said first head in interfitting engagement, at least one ring having complementary male and female circular cylindrical surfaces on opposite sides thereof and concentric with its center, said male and female surfaces having diameters equal to the cylindrical surface and recess of said first and second heads respectively, each said ring having oppositely inclined alternately right and left handed helical surfaces in a plurality of successive segments on opposite sides of the ring, said heads disposed with said rings interposed coaxially therebetween and with the cylindrical surfaces and helical surfaces of the heads and rings in complementary interfitting relationship, a plurality of sets of segmental blades respectively interposed between adjacent pairs of said rings and between said rings and heads with the blades of each set respectively adjacent said helical surfaces on the successive segments thereof, and a plurality of removable fasteners respectively extending through the corresponding segments of said heads and rings and adjacent segmental blades to draw same together.

2. A hub comprising a plurality of circular members each having oppositely inclined alternately right and left handed helical surfaces in a plurality of successive segments on opposite faces of the members, said members secured in coaxial alignment with the surfaces of adjacent members disposed in complementary relationship to define generally sinusoidal blade receiving slots in the periphery thereof between adjacent members, at least one blade in each of said slots, and means for holding said blades in said slots.

3. A hub comprising a pair of coaxially spaced generally cylindrical heads respectively having alternately right and left handed helical surfaces in a plurality of successive segments of their facing end faces, at least one ring coaxially interposed between said heads and each having alternately right and left handed helical surfaces in a plurality of successive segments of its opposite faces, and a plurality of segmental blades respectively secured between the helical surfaces of said ring and heads.

References Cited in the file of this patent
UNITED STATES PATENTS

| | | |
|---|---|---|
| 943,102 | Schleicher | Dec. 14, 1909 |
| 1,019,564 | Unterloff | Mar. 5, 1912 |
| 1,358,533 | Elston | Nov. 9, 1920 |
| 1,395,309 | Taber | Nov. 1, 1921 |
| 1,589,901 | Roberts | June 22, 1926 |
| 2,703,446 | Jensen | Mar. 8, 1955 |
| 2,958,118 | Neilsen | Nov. 1, 1960 |